United States Patent [19]

Izidon et al.

[11] Patent Number: 5,325,302
[45] Date of Patent: Jun. 28, 1994

[54] GPS-BASED ANTI-COLLISION WARNING SYSTEM

[75] Inventors: Aviv Izidon, Azor; Yaron Sheinman, Karme-Yosef, both of Israel

[73] Assignee: BVR Technologies, LTD., Israel

[21] Appl. No.: 763,934

[22] Filed: Sep. 23, 1991

[30] Foreign Application Priority Data

Oct. 15, 1990 [IL] Israel ..................................... 95990

[51] Int. Cl.$^5$ .......................... G06F 7/70; G06G 7/78
[52] U.S. Cl. .............................. 364/461; 364/424.06; 364/443; 342/176; 342/455
[58] Field of Search ................... 364/461, 443, 424.06; 342/176, 455, 32; 343/6.5 LC, 6.5 R; 434/12; 317/101 R; 370/95.1; 244/3.21; 89/1.57

[56] References Cited

U.S. PATENT DOCUMENTS

| | | | |
|---|---|---|---|
| 3,908,933 | 9/1975 | Gross et al. | 244/3.21 |
| 3,967,161 | 6/1976 | Lichtblau | 317/101 R |
| 4,333,402 | 6/1982 | Landstrom et al. | 102/505 |
| 4,359,733 | 11/1982 | O'Neill | 343/6.5 LC |
| 4,552,533 | 11/1985 | Walmsley | 434/12 |
| 4,611,209 | 9/1986 | Lemelson et al. | 343/6.5 R |
| 4,777,489 | 10/1988 | Allan | 342/176 |
| 4,802,400 | 2/1989 | Griffin et al. | 89/1.57 |
| 5,077,673 | 12/1991 | Brodegard et al. | 364/461 |
| 5,121,391 | 6/1992 | Paneth et al. | 370/95.1 |

FOREIGN PATENT DOCUMENTS

| | | |
|---|---|---|
| 0200787 | 11/1986 | European Pat. Off. . |
| 0370640 | 5/1990 | European Pat. Off. . |
| 0249493 | 1/1992 | European Pat. Off. . |

*Primary Examiner*—Thomas G. Black
*Assistant Examiner*—Jacques H. Louis-Jacques
*Attorney, Agent, or Firm*—Daniel J. Kluth

[57] ABSTRACT

A warning system for predicting collision between two or more relatively moving objects, comprising a position determination element for determining at a predetermined frequency for each one of the objects a respective location in space relative to a fixed frame of reference so as to produce successive frames of positional data for each object and a memory element coupled to the position a determination element for storing the successive frames of positional data. A path analysis element is coupled to the memory element and is responsive to successive respective locations of each of the objects for computing a trajectory for each object relative to the fixed frame of reference while an intersection analysis element coupled to the path analysis element and responsive to each one of the computed trajectories predicts whether two or more trajectories will intersect. A warning element is coupled to the intersection analysis element for warning respective ones of the objects of an impending collision.

26 Claims, 4 Drawing Sheets

GPS-BASED ANTI-COLLISION WARNING SYSTEM

FIELD OF THE INVENTION

This invention relates generally to an anti-collision warning system. In particular it relates to such a system for use with real-time and retrospective debriefing of air, land and sea battle scenarios.

BACKGROUND OF THE INVENTION

A modern air battle is characterized by the following features:

(1) very long ranges between participating aircraft and deployment of missiles having correspondingly long ranges, (2) very high closing velocities, and (3) only a partial picture of those participating in battle (i.e. only very rarely does the situation obtain wherein all participants see one another).

These characteristics also result in the fact that a number of aircraft fighting together (either on the same side or against each other) within a predetermined air volume are likely to collide not only because of pilot error but simply on account of what is currently termed "flying risk". There is no system today (based on the proposed structure) which is able to warn a pilot of such collision and to instruct him what remedial steps he should undertake under these critical conditions.

In a modern air battle it is difficult to keep track of vital data which not only complicates the task of making correct strategic maneuvers but also complicates post-battle debriefing. There exist a number of systems which are intended to solve this problem but their solutions are only partial and the systems themselves are extremely expensive.

In particular, the following parameters are not fully provided by prior art systems:

(1) a knowledge of the exact location in space of the aircraft;

(2) a missile which is fired in air combat training is not seen in the sky and actually there is absolutely no indication of the fact that it has been fired;

(3) simulation of a missile launch and of its striking a target;

(4) identification of a target that has been hit by a simulated missile; and (5) post-battle debriefing for gunnery.

As a result of the above, the pilot himself must judge whether his weapon system operation did indeed strike the target. Any error in the pilot's judgement leads to a change in the battle and can lead to a complete misunderstanding regarding the correct situation of the war.

When dealing with large numbers of participating aircraft, the situation can arise wherein "everybody shoots down everybody else" without knowing who was the first to shoot, and therefore remains in the battle, and who really are disabled.

Existing systems are limited either with regard to a specific ground area or with regard to a specific type of aircraft and clearly are unable to address the problems explained above.

Typically, existing fighter aircraft debriefing tools permit a pilot's performance to be analyzed retroactively and thus provide no real time feedback during flight. There exists, for example, a system which is custom-built for the F16 fighter aircraft which is installed in each participating aircraft and records details of the aircraft's flight pattern. After a flight, the data is removed from the pod in each participating aircraft and fed to a central ground station, whereby the complete flight scenario may be played back and analyzed. However, such a system is not useful for real time flight monitoring, is expensive and may be used only in F16 aircraft for which it is customized.

SUMMARY OF THE INVENTION

It is an object of the invention to provide a warning system for predicting collision between two or more relatively moving objects and which may be incorporated within moving vehicles so as to provide their operators with an anti-collision warning in real time.

According to the invention there is provided a warning system for predicting collision between two or more relatively moving objects, said system comprising:

position determination means for determining at a predetermined frequency for each one of said objects a respective location in space relative to a fixed frame of reference so as to produce successive frames of positional data for each object, memory means coupled to the position determination means for storing therein the successive frames of positional data, path analysis means coupled to the memory means and responsive to successive respective locations of each of the objects for computing a trajectory for each object relative to the fixed frame of reference, intersection analysis means coupled to the path analysis means and responsive to each one of the computed trajectories for predicting whether two or more trajectories will intersect, and warning means coupled to the intersection analysis means for warning respective ones of said objects of an impending collision.

Thus, the invention provides a real time warning system which may be incorporated within aircraft, sea or land vehicles or, indeed, in any combination thereof and which does not have to be customized for each specific vehicle.

Preferably, the position determination means includes a Global Positioning System combined with an Inertial Navigation System, whereby the position of a participating vehicle as well as its predicted path may be determined with high accuracy.

In a preferred embodiment of the invention, a communications link is provided in each of the participating vehicles, whereby the positional data in respect of each moving vehicle may be transmitted to each of the other moving vehicles. In this way, each participating vehicle is provided with a complete picture relating to its own performance and to that of all the other participating vehicles, thereby facilitating real time analysis.

Preferably, there are included means for simulating the launching of a missile, whereby the trajectory of the simulated missile may be predicted in real time and compared with the predicted paths of each of the participating vehicles so as to determine whether one of them will be hit by the simulated missile.

BRIEF DESCRIPTION OF THE DRAWINGS

The invention will now be described, by way of non-limiting example only, with regard to a warning system for predicting collision between two or more aircraft and with reference to the accompanying drawings, in which.

DETAILED DESCRIPTION OF A PREFERRED EMBODIMENT

Figure 1:
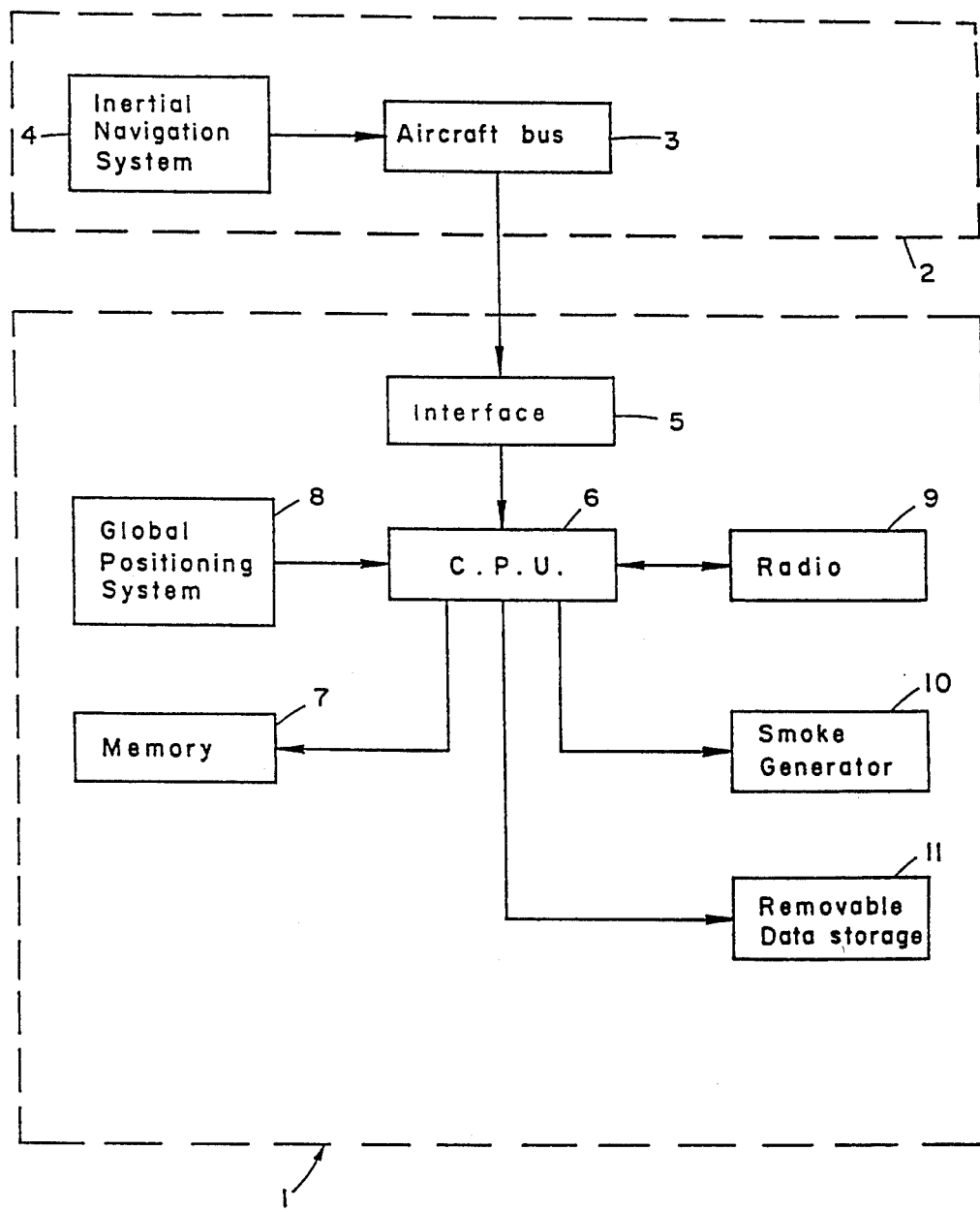
FIG. 1 is a block diagram showing schematically a system according to the invention.

Referring to FIG. 1 there is shown an anti-collision system comprising a pod depicted generally as 1 for coupling to a fighter aircraft depicted generally as 2. The aircraft 2 is provided with an AIRCRAFT BUS 3 coupled to an INERTIAL NAVIGATION SYSTEM (INS) 3 which is frequently provided as a standard feature of aircraft navigational systems but can equally be a separate unit within the pod 1.

Provided within the pod 1 is an INTERFACE 5 by means of which the pod 1 may be coupled to the AIRCRAFT BUS 3. ,A central processing unit (CPU) 6 is connected to the INTERFACE 5.

Coupled to the CPU 6 is a MEMORY 7 for storing therein an instruction set for controlling the CPU 6. Also coupled to the CPU 6 are a GLOBAL POSITIONING SYSTEM 8, a RADIO 9, a SMOKE GENERATOR 10 and a REMOVABLE DATA STORAGE 11.

The system operates as follows. Each participating aircraft carries one pod 1 coupled to its respective AIRCRAFT BUS 3. Under control of the respective CPU 6, the INERTIAL NAVIGATION SYSTEM 4 together with the GLOBAL POSITIONING SYSTEM 7 determine a respective location in space for each participating aircraft relative to a fixed frame of reference. The INERTIAL NAVIGATION SYSTEM 4 and the GLOBAL POSITIONING SYSTEM 8 operate continuously at a predetermined frequency so as to produce successive frames of positional data for each participating aircraft.

The RADIO 9 is adapted to transmit radio frequency data to all other participating aircraft as well as to receive radio frequency data therefrom by means of a suitable antenna 12 (see FIG. 5) mounted on the aircraft.

The C.P.U. 6 records a flight scenario to be recorded on the REMOVABLE DATA STORAGE 11 typically comprising a data cartridge which can then be removed for subsequent analysis and/or processing in a debriefing session.

The function of the SMOKE GENERATOR 10 is to produce a smoke signal which provides a visual indication that a simulated missile has been fired by an aircraft or that the aircraft has been hit by a simulated missile, as will be explained below with particular reference to FIG. 3 of the drawings.

The REMOVABLE DATA STORAGE 11 (i.e. data cartridge also affords a means whereby particular parameters relating to the current exercise may be fed into the pod 1 so as to facilitate correct real-time analysis.

Figure 2:
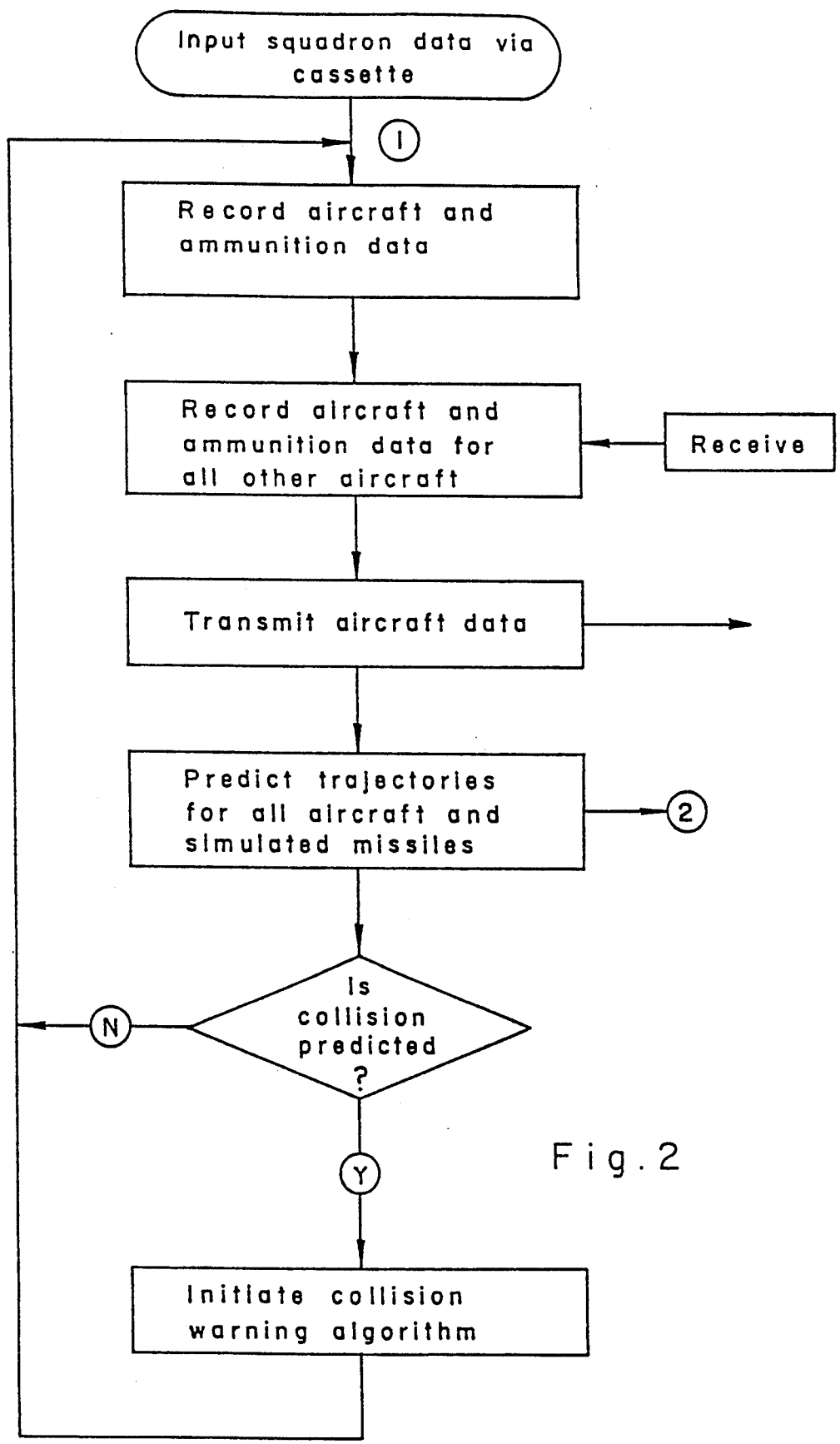
FIG. 2 is a flow chart showing the principal operational steps in the system shown in FIG. 1.

FIG. 2 shows part of an algorithm for operating the CPU 6 shown in FIG. 1. At the start of the procedure, squadron data is input to each pod 1 via a pre-recorded cassette for performing initialization of relevant parameters and exercise data. On actuating the system, aircraft and ammunition data are recorded and stored in the MEMORY 7 (FIG. 1). During a flight session, missile launching is simulated and not actually performed, but it is still necessary to know how many "simulated missiles" are available so that a pilot cannot exceed the maximum available number. After recording within its own MEMORY 7 the relevant aircraft and ammunition data, this data is then transmitted via the RADIO 9 to all the other participating aircraft.

The INERTIAL NAVIGATION SYSTEM 4 together with the GLOBAL POSITIONING SYSTEM 8 determine for each participating aircraft its absolute position in space relative to a fixed frame of reference, this information being constantly updated and then transmitted to all the other participating aircraft. The INERTIAL NAVIGATION SYSTEM 4 predicts the aircraft's location in space from a knowledge of its instantaneous acceleration in all three axes, whilst the GLOBAL POSITIONING SYSTEM 8 provides a more accurate indication of the aircraft's location so that acting together a very accurate picture of the aircraft's location and momentum may be determined.

This information permits the trajectory of the aircraft to be predicted, the prediction being constantly refined as the positional and acceleration data of the aircraft are updated. The trajectories are predicted in respect of all the participating aircraft and are then checked to ensure whether two or more trajectories intersect, thereby indicating an ensuing collision. In the event that such a collision is predicted, the pilots of the respective aircraft are warned thereby permitting them to take appropriate remedial action.

It should be understood that not only is positional data stored in respect of the aircraft (constituting moving objects) but also a static picture of the "world" (constituting fixed objects in space) may be stored so that a collision between an aircraft and the earth may also be predicted.

Figure 3:
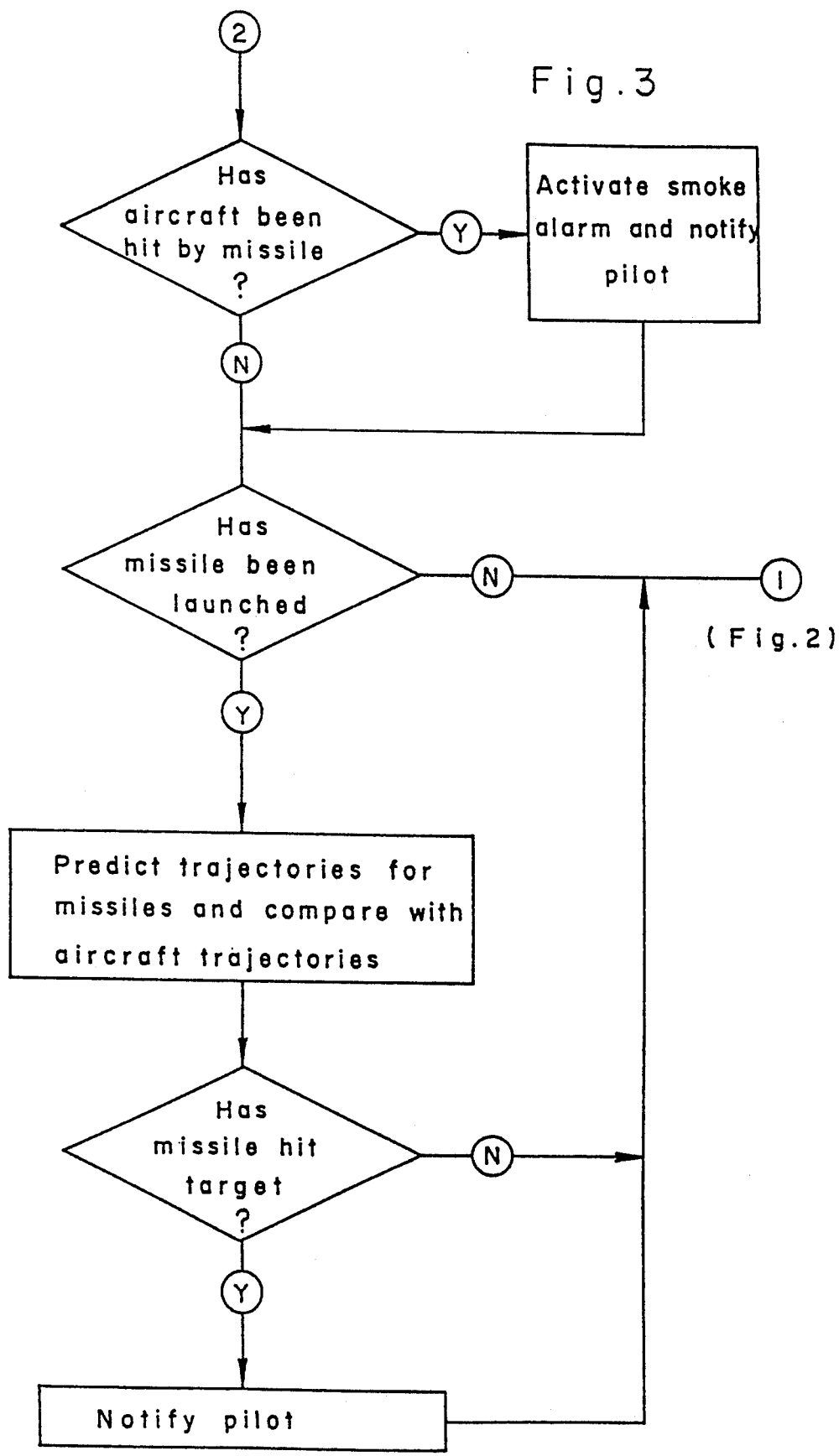
FIG. 3 is a flow chart relating to FIG. 2 and showing additional steps in a missile-launching algorithm.

Referring now to FIG. 3 of the drawings, there is shown an algorithm according to which the launching of a missile from an aircraft may be simulated within the system shown in FIG. 1, thereby permitting the system to be a useful training aid for fighter pilots whilst avoiding the obvious risk of using live ammunition. A "simulated" missile is launched in the normal way by the pilot by activation of a suitable button within the aircraft cockpit. On activation of the appropriate button, no missile is actually launched but the algorithm shown, in part, in FIG. 3 is initiated. Thus, under control of the CPU 6 the location in space of the simulated missile is constantly determined by means of the INERTIAL NAVIGATION SYSTEM 4 and the GLOBAL POSITIONING SYSTEM 8, based on a pre-recorded knowledge of the missile's dynamic properties such as weight, drag, initial velocity and so on, all of which are recorded within the MEMORY 7 as soon as the system is actuated.

From a knowledge of the location in space and the momentum of all simulated missiles, the trajectories of simulated missiles may be determined in a similar manner to the determination of the aircraft trajectories. The missile trajectories are then compared with the aircraft trajectories in order to determine, in real time, whether a missile has hit its target. It should be understood that whilst the missile trajectories are simulated, the comparison with the simulated missile trajectories and the aircraft trajectories is not performed using predicted aircraft trajectories but rather actual current aircraft locations in space. Thus, the simulated missile trajectories are not compared with predicted aircraft trajectories in order to establish whether a missile will strike an aircraft some time in the future but are compared with current aircraft locations in real time so that an aircraft is able to take appropriate remedial action to avoid being hit by a missile without giving a false indication to the missile simulation algorithm.

In the event that the missile simulation algorithm establishes that an aircraft has been hit by a missile, the CPU 6 sends an appropriate signal to the SMOKE GENERATOR 10 which generates a suitable smoke signal for alerting the pilot of the launching aircraft that his missile hit its target. The SMOKE GENERATOR 10 constitutes a first indication means for indicating that the aircraft has been hit by a missile. Within the cockpit of each aircraft is provided a suitable audio system (constituting a second indication means) which is actuated when the missile simulation algorithm determines that a missile launched from an aircraft has hit its target and provides an indication to the pilot of the target aircraft that he has been hit.

The manner in which participating aircraft transmit and receive data to one another is as follows. Each aircraft is independently randomly allocated a time slice for transmitting its positional data to the remaining participating aircraft. Before transmitting data, the aircraft checks whether any other aircraft are currently using the randomly allocated time slice for transmitting their own positional data and, if so, the time slices in respect of all overlapping transmitters are re-allocated, each independently and randomly. When an aircraft about to transmit its positional data hears that the airwaves are clear, its positional data are transmitted within the randomly allocated time slice, after which the radio is used in a receive mode for receiving the positional data transmitted by the remaining participating aircraft.

Such a procedure enables only a single antenna to be employed for both transmitting and receiving and avoids collisions between transmissions with consequent data loss. In an actual system, the time required to transmit 300 bits at a rate of 500 KBs$^{-1}$ is 600 $\mu$s to which time must be added some contingency to allow for the information to reach the receiving aircraft and to permit synchronization between the transmissions.

The time taken for a signal travelling at the speed of light to reach a range of 60 Km is 0.2 ms or 200 $\mu$s. A further 100 bits of information are dedicated for synchronization and altogether 1 ms is required to permit the total number of bits of data to be successfully transmitted and received. In order to provide further contingency, a time slice of 2 ms is allocated. A cycle time of 200 ms permits 100 participating aircraft to transmit and receive data each within a time slice of 2 ms. However, in practice, each aircraft transmits twice so as to reduce the risk of data loss and consequently such a configuration permits 50 aircraft to participate and to update each other regarding their locations at a frequency of 10 Hz.

It will be understood that what has been stated above is by way of example only. The system is equally well suited for use with other vehicles having velocities very much lower than aircraft, thereby permitting much larger cycle times to be employed or, alternatively, many more vehicles to participate in a battle scenario.

Figure 4:
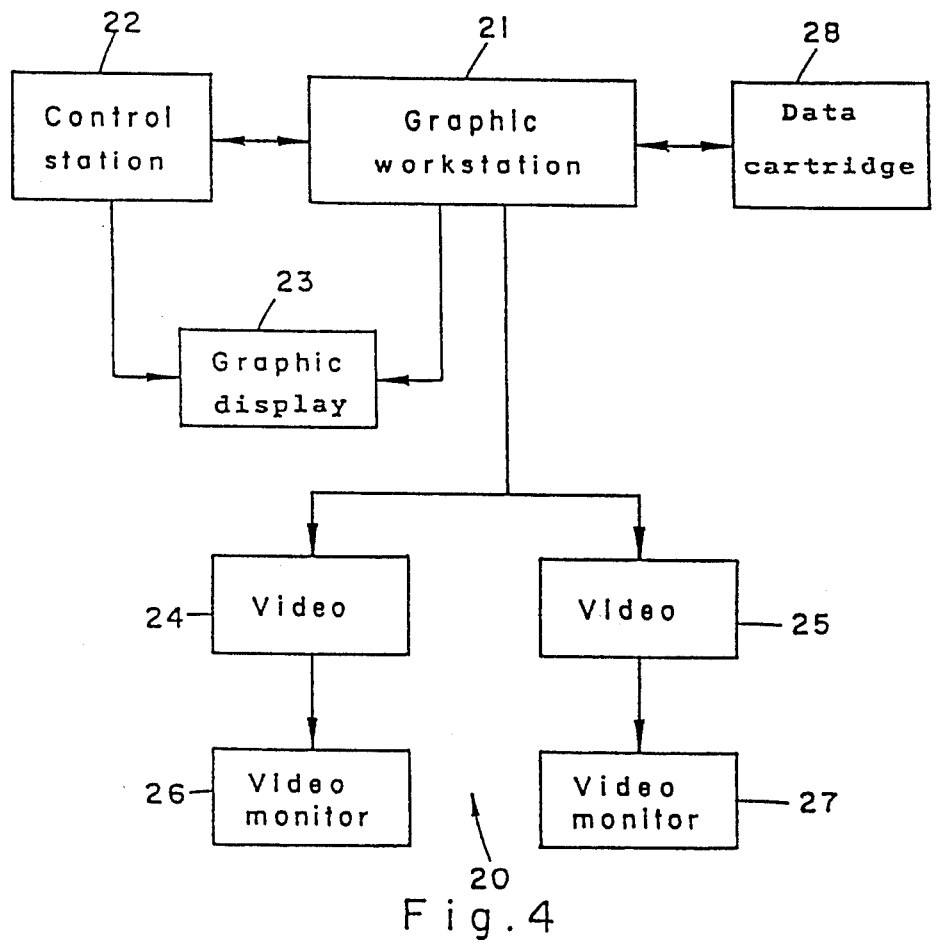
FIG. 4 is a block diagram showing the principal elements of a ground-based debriefing station for use with the system shown in FIG. 1.

Referring now to FIG. 4 of the drawings, there is shown a ground-based debriefing station designated generally as 20 comprising a GRAPHIC WORK STATION 21 coupled to a CONTROL STATION 22. A GRAPHIC DISPLAY 23 is coupled to the GRAPHIC WORK STATION 21 and the CONTROL STATION 22. Also coupled to the GRAPHIC WORK STATION 21 are a pair of VIDEO INTERFACES 24 and 25 each connected to respective VIDEO MONITORS 26 and 27.

Data is fed to the GRAPHIC WORK STATION 21 via a DATA CARTRIDGE 28 coupled thereto and corresponding to the REMOVABLE DATA STORAGE 11 shown in FIG. 1.

The operation of the system is as follows. Upon sortie termination, each pilot unloads the DATA CARTRIDGE 28 from the pod 1 and loads it into the GRAPHIC WORKSTATION 21 within the debriefing station 20. The GRAPHIC WORKSTATION 21 includes a memory for storing the data thus loaded therein and a computer for processing and synchronizing the data relating to all the participating aircraft whose respective data have been loaded into the GRAPHIC WORKSTATION 21. The data of all participating aircraft is prepared for playback/debriefing by the computer, after which the previous sortie may be displayed on the GRAPHIC DISPLAY 23 for debriefing.

It is clearly important to package the system shown in FIG. 1 within an aircraft such that the aerodynamic properties of the aircraft are substantially unchanged. This is no small problem particularly bearing in mind that there is very little free space available within the aircraft.

Figure 5:
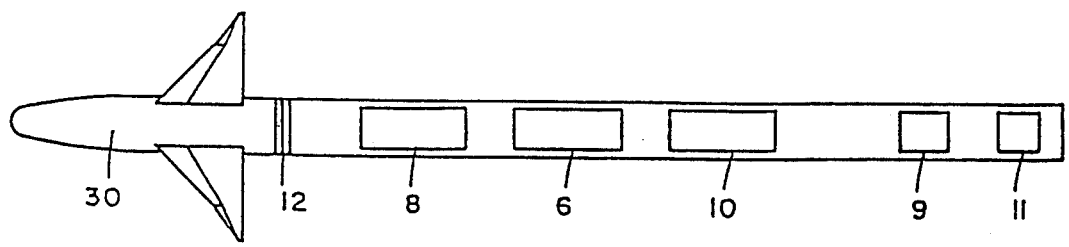
FIG. 5 is a pictorial representation showing how a system according to the invention may be packaged in a missile shell.

FIG. 5 shows a solution to this problem, wherein one of the missiles carried by the aircraft is modified so that only the missile shell is employed. Thus, FIG. 5 shows a missile shell 30 from which the detonator and explosive charge have been removed. The pod 1 (FIG. 1) comprising the C.P.U. 6, the G.P.S. 8, the RADIO 9, the SMOKE GENERATOR 10 and the DATA STORAGE 11 is then built within the missile shell 30 in such a manner that its mass and center of gravity correspond to those of the original missile. The missile is unable to explode since its explosive charge has been removed, but all its other functions, such as its seeker and control electronics, remain intact.

Clearly, since the original missile shell 30 is employed for housing the pod 1, so too will the aerodynamic properties of the missile shell 30 as well as those of the aircraft remain unchanged. The coupling between the missile and the aircraft is employed in order to transmit data from the aircraft to the anti-collision and missile simulation system and also to receive data therefrom.

Also, in order not to alter the aerodynamic properties of the aircraft, it is preferable that the antenna 12, by means of which the RADIO 9 (shown in FIG. 1) transmits and receives radio frequency data, should not project from the surface of the aircraft. To this end, the antenna 12 comprises a strip of metal foil bonded to an outer surface of the missile shell 30 or otherwise printed or painted thereon.

The invention thus provides an anti-collision and missile simulation system which is both more effective and cheaper than hitherto proposed systems. On account of the fact that each aircraft maintains radio contact with all other participating aircraft and thus knows their locations in space and their trajectories, the system is able to predict a resulting collision and to inform the pilot of the threatened aircraft.

In the event that a threatened aircraft is actually hit by a missile, a suitable smoke signal is generated thereby which informs all the remaining aircraft that the threatened aircraft has been hit. A suitable signal is also transmitted to the pilot of the threatened aircraft. The actual launching of the simulated missile is also simulated by means of a smoke streak emitted from the launching aircraft.

At the end of a flight session, the performance of all participating aircraft may be analyzed at a ground station by playing back all pre-recorded data cartridges carrying each participating aircraft's in-flight data.

The system according to the invention thus revolutionizes the concept of combat simulation since it permits real-life combat scenarios to be simulated much more realistically than was possible with hitherto proposed systems and also greatly increases the accuracy of subsequent debriefing sessions.

It will be appreciated that whilst the invention has been described with particular reference to fighter aircraft, it is equally suitable for use with ships and land vehicles or, indeed, any combination thereof.

We claim:

1. A warning system for predicting collision between two or more relatively moving objects, said system comprising:
   GPS receiver means for receiving accurate timing data from a fixed frame of reference,
   position determination means connected to the GPS receiver means and operable for determining at a predetermined frequency for each one of said moving objects a respective location in space relative to said fixed frame of reference so as to produce successive frames of positional data for each object,
   memory means coupled to the position determination means for storing therein the successive frames of positional data,
   transceiver means on each of said moving objects for transmitting the successive frames of positional data form each one of said moving objects to each of the other ones of said moving objects, and for receiving the successive frames of positional data from each one of the other of said moving objects,
   path analysis means coupled to the memory means and the transceiver means, and responsive to the successive frames of positional data of each of the moving objects for computing a trajectory for each object relative to the fixed frame of reference,
   intersection analysis means coupled to the path analysis means and responsive to each one of the computed trajectories for predicting whether two or more trajectories will intersect, and
   warning means coupled to the intersection analysis means for warning respective ones of said objects of an impending collision.

2. The system according to claim 1, wherein for a subset of moving objects each of which is capable of movement relative to the fixed frame of reference, there is further provided:
   a communications link connected to said transceiver means for enabling each one of the moving objects to update all the remaining moving objects of its current location in space as determined by the position determining means.

3. The system according to claim 2, wherein for the subset of moving objects there is further provided:
   data storage means for storing therein positional data in respect of a subset of fixed objects each of which is stationary relative to the fixed frame of reference;
   said intersection analysis means being coupled to the data storage means and responsive to the positional data stored therein for predicting whether one or more of said trajectories will intersect with one or more of said fixed objects.

4. The system according to claim 3, wherein the data storage means includes a data input for inputting prerecorded image of said moving objects moving relative to each other and to said fixed objects;
   there being further provided a video monitor for displaying said pre-recorded image.

5. The system according to claim 3, wherein each one of the moving objects includes: a removable data storage means for storing therein data relating to the moving objects moving relative to each other and to the fixed objects;
   a data output coupled to the removable data storage means for producing a video signal representative of data stored therein; and
   a video monitor coupled to the removable data storage means and responsive to said video signal for displaying the stored data as a video image.

6. The system according to claim 5, further including:
   a fixed observation station for analyzing the performance of said moving object, the observation station comprising:
   data input means for inputting pre-recorded data stored within said data storage means,
   a graphic workstation coupled to the video input means for permitting said performance to be controlled, and
   at least one video monitor coupled tot he graphic work-station for monitoring said performance.

7. The system according to claim 2, wherein the communications link for each moving object further includes:
   allocation means for allocating an available time slice which is unused by any of the remaining moving objects,
   transmitting means responsively coupled to the allocation means for transmitting positional data of the moving object to all of the remaining moving objects,
   receiving means for receiving data transmitted by all of the remaining moving objects, and
   antenna means for enabling an R. F. signal to be transmitted and received.

8. The system according to claim 7, wherein the antenna means comprises a strip of electrically conductive material on an outer surface of the moving object.

9. The system according to claim 8, wherein the strip is a foil bonded to the outer surface of the moving object.

10. In the system according to claim 7, a method for communicating between said moving objects, comprising the steps of:
    for each moving object randomly allocating a time slice for transmitting positional data in respect of said moving object to all the other moving objects,
    during said time slice, checking that no other moving object is transmitting its own positional data and, if so, randomly re-allocating the time slices in respect of all moving objects sharing the same time slice until all the moving objects are allocated different time slices, and transmitting the positional data of the moving object to all the other moving objects during the time slice allocated in respect of said moving object.

11. The method according to claim 10, wherein the time slice has a time interval which is a predetermined function of the number of moving objects.

12. The system according to claim 2, wherein each one of the moving objects is further provided with missile launching simulation means for simulating launching a missile, said missile launching simulation means comprising:

trajectory prediction means for predicting in real time a missile trajectory as a function of predetermined initial conditions;

the trajectory prediction means being coupled to the intersection analysis means whereby the intersection analysis means is responsive to all of the computed trajectories input thereto for predicting whether any one of the objects will cross an impact zone of the missile.

13. The system according to claim 12, wherein each moving object further includes:

first indication means for indicating that the object has been hit by a missile, and second indication means for indicating that a missile launched form the object has hit a target.

14. The system according to claim 13, wherein the first indication means includes a smoke generator for generating a smoke signal.

15. The system according to claim 2, wherein:

each moving object is provided with missile carrier means for supporting a missile, and a major part of the system is built within a missile shell such that the mass, center of gravity and aerodynamic properties of the moving object are unchanged.

16. The system according to claim 15, wherein said communications link further includes:

allocation means for allocating an available time slice to each moving object which is unused by any of the other moving objects, transmitting means responsively coupled to the allocation means for transmitting positional data of each moving object to all of the other moving objects, receiving means for receiving data transmitted by all of the other moving objects, and antenna means for enabling an R. F. signal to be transmitted and received.

17. The system according to claim 16, wherein the antenna means comprises a strip of electrically conductive material on an outer surface of the missile shell.

18. The system according to claim 17, wherein the strip is a foil bonded to the outer surface of the missile shell.

19. The system according to claim 15, wherein the missile is provided with an electrical connection for electrically connecting the missile to the moving object, said electrical connection permitting telecommunication between the system and an operator located within the moving object.

20. The system according to claim 19, including indication means for indication that the moving object has been hit by a simulated missile, wherein:

said indication means are located within said missile shell, and a signal is passed form the indication means to said operator via said electrical connection.

21. The system according to claim 1, wherein:

the position determination means includes an inertial navigation system coupled to a global positioning system.

22. The system according to claim 1, wherein the relatively moving objects include at least one aircraft.

23. An anti-collision warning apparatus for use by an aircraft, comprising:

an inertial navigation system;

a global positioning system receiver;

a radio transceiver;

a central processor connected to he inertial navigation system, connected to the global positioning system receiver and connected to the radio transceiver, and operable for receiving global positioning data from the global positioning system receiver, receiving inertial navigation data from the inertial navigation system, for calculating position data of the aircraft, for transmitting the position data of the aircraft through the radio transceiver, for receiving position data of other aircraft through the radio transceiver, for calculating a first trajectory for the aircraft, for calculating other trajectories of the other aircraft, and for generating a warning if the first trajectory and any of he other trajectories indicate a potential collision.

24. An anti-collision warning apparatus for use by an aircraft equipped with an inertial navigation system, comprising:

an interface for connection to an aircraft bus of the aircraft and for communicating with the inertial navigation system (INS) of the aircraft;

a global positioning system (GPS) receiver;

a radio transceiver;

a central processor connected to the INS through the interface, connected to the GPS receiver and connected to the radio transceiver, and operable for receiving GPS data from the GPS receiver, receiving INS data through the interface, for calculating position data of the aircraft, for transmitting the position data of the aircraft through the radio transceiver, for receiving position data of other aircraft through the radio transceiver, for calculating a first trajectory for the aircraft, for calculating other trajectories of the other aircraft, and for sending a warning through the interface if the first trajectory and any of the other trajectories indicate a potential collision.

25. A method of warning of imminent air collisions between a first moving object and other moving objects, comprising the steps of:

receiving Global Positioning System satellite data;

receiving inertial navigation information;

calculating the location and acceleration of the first moving object in three axes and for producing therefrom position data;

transmitting the position data of the first moving object to all the other moving objects;

receiving other position data of the other moving objects;

calculating a first trajectory for the first moving object;

calculating other trajectories of the other moving objects; and generating a warning if the first trajectory and any of the other trajectories indicate a potential collision.

26. The method of claim 25, wherein the step of transmitting the position data of the first moving object to all the other moving objects comprises the further steps of:
  providing a common radio frequency for all moving objects;
  randomly allocating a time slice for each of the moving objects within the common radio frequency;
  determining if the time slice is not used by another moving object; and
  transmitting the position data within the time slice.

* * * * *

UNITED STATES PATENT AND TRADEMARK OFFICE
CERTIFICATE OF CORRECTION

PATENT NO. : 5,325,302
DATED : June 28, 1994
INVENTOR(S) : Tzidon et al.

It is certified that error appears in the above-indentified patent and that said Letters Patent is hereby corrected as shown below:

On the title page item [19], delete "Izidon et al." and insert --Tzidon et al.-- therefor.

Under Inventors: item [75], delete "Aviv Izidon," and insert --Aviv Tzidon,-- therefor.

Under Column 8, Line 37, please delete "tot he" and insert --to the-- therefor.

Under Column 7, Line 42, please delete "form" and insert --from-- therefor.

Signed and Sealed this

Twenty-third Day of July, 1996

Attest:

BRUCE LEHMAN

Attesting Officer

Commissioner of Patents and Trademarks